(12) United States Patent
Oh

(10) Patent No.: US 9,875,410 B2
(45) Date of Patent: Jan. 23, 2018

(54) CAMERA SYSTEM FOR TRANSMITTING AND RECEIVING AN AUDIO SIGNAL AND OPERATING METHOD OF THE SAME

(71) Applicant: Hanwha Techwin Co., Ltd., Changwon-si (KR)

(72) Inventor: Jaeyoon Oh, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 91 days.

(21) Appl. No.: 14/940,988

(22) Filed: Nov. 13, 2015

(65) Prior Publication Data

US 2016/0148057 A1 May 26, 2016

(30) Foreign Application Priority Data

Nov. 26, 2014 (KR) .......................... 10-2014-0166632

(51) Int. Cl.
| | |
|---|---|
| *H04N 5/60* | (2006.01) |
| *H04R 1/00* | (2006.01) |
| *G06K 9/00* | (2006.01) |
| *H04R 1/40* | (2006.01) |
| *H04N 7/18* | (2006.01) |
| *H04R 29/00* | (2006.01) |
| *G06K 9/62* | (2006.01) |
| *G10L 21/0216* | (2013.01) |

(52) U.S. Cl.
CPC ....... *G06K 9/00771* (2013.01); *G06K 9/6289* (2013.01); *H04N 7/183* (2013.01); *H04R 1/406* (2013.01); *H04R 29/002* (2013.01); *H04R 29/005* (2013.01); *G10L 2021/02166* (2013.01); *H04N 5/60* (2013.01); *H04R 2203/12* (2013.01); *H04R 2430/20* (2013.01)

(58) Field of Classification Search
None
See application file for complete search history.

(56) References Cited

U.S. PATENT DOCUMENTS

| | | | |
|---|---|---|---|
| 6,707,489 B1* | 3/2004 | Maeng | G01S 3/7864 348/14.08 |
| 2011/0193933 A1* | 8/2011 | Ryu | H04N 7/147 348/14.08 |
| 2015/0088515 A1* | 3/2015 | Beaumont | G10L 17/06 704/251 |

FOREIGN PATENT DOCUMENTS

| | | |
|---|---|---|
| JP | 2012-29209 A | 2/2012 |
| KR | 10-2008-0087939 A | 10/2008 |
| KR | 10-2011-0012354 A | 2/2011 |
| KR | 10-2011-0026753 A | 3/2011 |

(Continued)

*Primary Examiner* — Kevin McInnish
(74) *Attorney, Agent, or Firm* — Sughrue Mion, PLLC

(57) ABSTRACT

A camera system includes: a camera configured to capture an image of a surveillance area; a microphone array which includes at least one microphone; and at least one processor configured to implement: a video processor which designates at least one subject in the image as a target; a beam-former which calculates a rotation angle of the microphone array based on a location of the subject; and a driving controller which rotates the microphone array toward the subject based on the rotation angle of the microphone array, wherein the beam-forming unit further performs signal processing on an audio input signal received through the microphone array rotated toward the subject and outputs an audio output signal corresponding to the audio input signal.

15 Claims, 15 Drawing Sheets

(56) References Cited

FOREIGN PATENT DOCUMENTS

KR   10-2012-0063607 A   6/2012

* cited by examiner

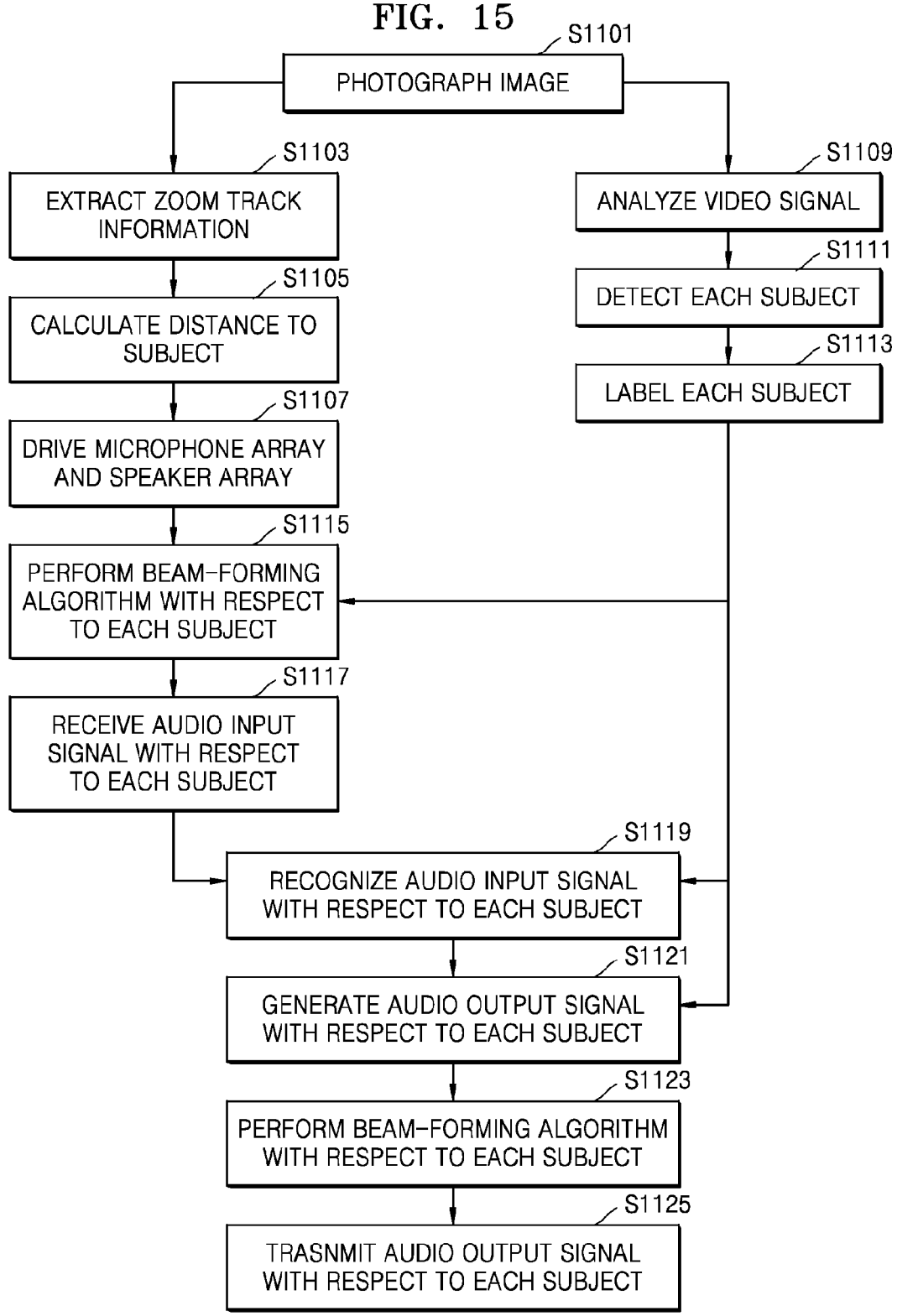

CAMERA SYSTEM FOR TRANSMITTING AND RECEIVING AN AUDIO SIGNAL AND OPERATING METHOD OF THE SAME

CROSS-REFERENCE TO THE RELATED APPLICATION

This application claims priority from Korean Patent Application No. 10-2014-0166632, filed on Nov. 26, 2014, in the Korean Intellectual Property Office, the disclosure of which is incorporated herein in its entirety by reference.

BACKGROUND

1. Field

Apparatuses and methods consistent with exemplary embodiments relate to a camera system and a method of operating the camera system.

2. Description of the Related Art

Recently, camera systems are installed inside or outside buildings, in streets, etc., for various purposes such as crime prevention, security, store management, etc.

According to surveillance objectives, camera systems capable of performing a function of selectively detecting sound of a specific sound source and a function of selectively transmitting an audio signal towards a specific subject are required.

SUMMARY

The exemplary embodiments of the inventive concept provide a camera system configured to transmit and receive audio signals and a method of operating the camera system.

Various aspects of the inventive concept will be set forth in part in the description which follows and, in part, will be apparent from the description, or may be learned by practice of the presented embodiments.

According to exemplary embodiments, there is provided a camera system which may include: a camera configured to capture an image of a surveillance area; a microphone array which includes at least one microphone; and at least one processor configured to implement: a video processor which designates at least one subject in the image as a target; a beam-former which calculates a rotation angle of the microphone array based on a location of the subject; and a driving controller which rotates the microphone array toward the subject based on the rotation angle of the microphone array, wherein the beam-forming unit further performs signal processing on an audio input signal received through the microphone array rotated toward the subject.

The camera system may further include a speaker array which comprises at least one speaker, and the processor may be further configured to implement an audio processor which generates an audio output signal based on the audio input signal received through the microphone array and controls the beam-former to transmit the audio output signal toward the subject through the speaker array.

In response to the subject not being located in a center of the image, the video processor may calculate a rotation angle of a lens of the camera, and the driving controller may rotate the lens of the camera based on the rotation angle of the lens so that the subject is located in the center of the image. In response to the subject being located in the center of the image, the video processor may designate the subject as the target.

The camera system may further include a speaker array which includes at least one speaker. The beam-former may determine a rotation angle of the speaker array based on the rotation angle of the microphone array, and the driving controller may rotate the speaker array toward the subject based on the rotation angle of the speaker array. The processor may be further configured to implement an audio processor which generates an audio output signal toward the subject corresponding to the audio input signal received through the microphone array.

The beam-former may calculate a distance from the camera to the subject, and calculate the rotation angle of the microphone array using the calculated distance.

The video processor may generate an image analysis result by performing at least one of facial recognition of the subject, a behavioral pattern analysis of the subject, and a situation analysis with respect to the image. The processor may be further configured to implement an audio processor which recognizes sound of the subject by matching the image analysis result with the audio input signal received through the microphone array and generates an audio output signal corresponding to the sound.

The at least one microphone may include a plurality of microphones, and the at least one subject may include a plurality of subjects. The beam-former may calculate rotations angles of the microphones based on locations of the subjects, respectively, and the driving controller may rotate the microphones toward the subjects based on the rotation angles of the microphones so that the beam former performs the signal processing on audio input signals received through the microphones rotated toward the subject, respectively.

The processor may be further configured to implement an audio processor which generates a plurality of audio output signals based on the audio input signals received through the microphones and controls the beam-former to transmit the audio output signals towards the subjects through the speakers, respectively.

The beam-former may transmit the audio output signals toward the subjects through the speakers, respectively, in a time division method.

The audio processor may generate the audio output signals which are multiplexed and different in at least one of size and phase, respectively.

According to exemplary embodiments, there is provided a method of operating a camera system including a camera and a microphone array which includes at least one microphone by using at least one processor. The method may include: capturing an image of a surveillance area using the camera; designating at least one subject in the image as a target; calculating a rotation angle of the microphone array based on a location of the subject; rotating the microphone array toward the subject based on the rotation angle of the microphone array; and receiving an audio input signal through the microphone array rotated toward the subject.

The method may further include: generating an audio output signal based on the audio input signal received through the microphone array; and transmitting the audio output signal toward the subject through the speaker array.

The method may further include: determining the location of the subject; and in response to the subject not being located in a center of the image, calculating a rotation angle of a lens of the camera, and rotating the lens based on the rotation angle of the lens so that the subject is located in the center of the image, wherein the designating the subject as the target is performed in response to the subject being located in the center of the image.

The camera system may further include a speaker array which comprises at least one speaker, and the method may further include: determining a rotation angle of the speaker array based on the rotation angle of the microphone array, and rotating the speaker array toward the subject based on the rotation angle of the speaker array; and generating an audio output signal toward the subject corresponding to the audio input signal received through the microphone array.

The method may further include calculating a distance from the camera to the subject which is used to calculate the rotation angle of the microphone array.

The method may further include: generating an image analysis result by performing at least one of facial recognition of the subject, a behavioral pattern analysis of the subject, and a situation analysis with respect to the image; and recognizing sound of the subject by matching the image analysis result with the audio input signal received through the microphone array and generating an audio output signal corresponding to the sound.

The at least one microphone may include a plurality of microphones, and the at least one subject may include a plurality of subjects. Then, the calculating the rotation angle of the microphone array may include calculating rotations angles of the microphones based on locations of the subjects, respectively, and the rotating the microphone array toward the subject may include rotating the microphones toward the subjects based on the rotation angles of the microphones to receive a plurality of audio input signals through the microphones rotated toward the subject, respectively.

The method may further include generating a plurality of audio output signals based on the audio input signals received through the microphones, and transmitting the audio output signals towards the subjects, respectively.

The transmitting the audio output signals toward the subjects, respectively, may be performed in a time division method.

The audio output signals may be signals which are multiplexed and different in at least one of size and phase, respectively.

BRIEF DESCRIPTION OF THE DRAWINGS

These and/or other aspects will become apparent and more readily appreciated from the following description of the embodiments, taken in conjunction with the accompanying drawings, in which:

FIG. 15 is a flowchart of a method of transmitting and receiving an audio signal with respect to each of a plurality of subjects, using a camera system, according to an exemplary embodiment.

DETAILED DESCRIPTION OF THE EXEMPLARY EMBODIMENTS

Figure 1:
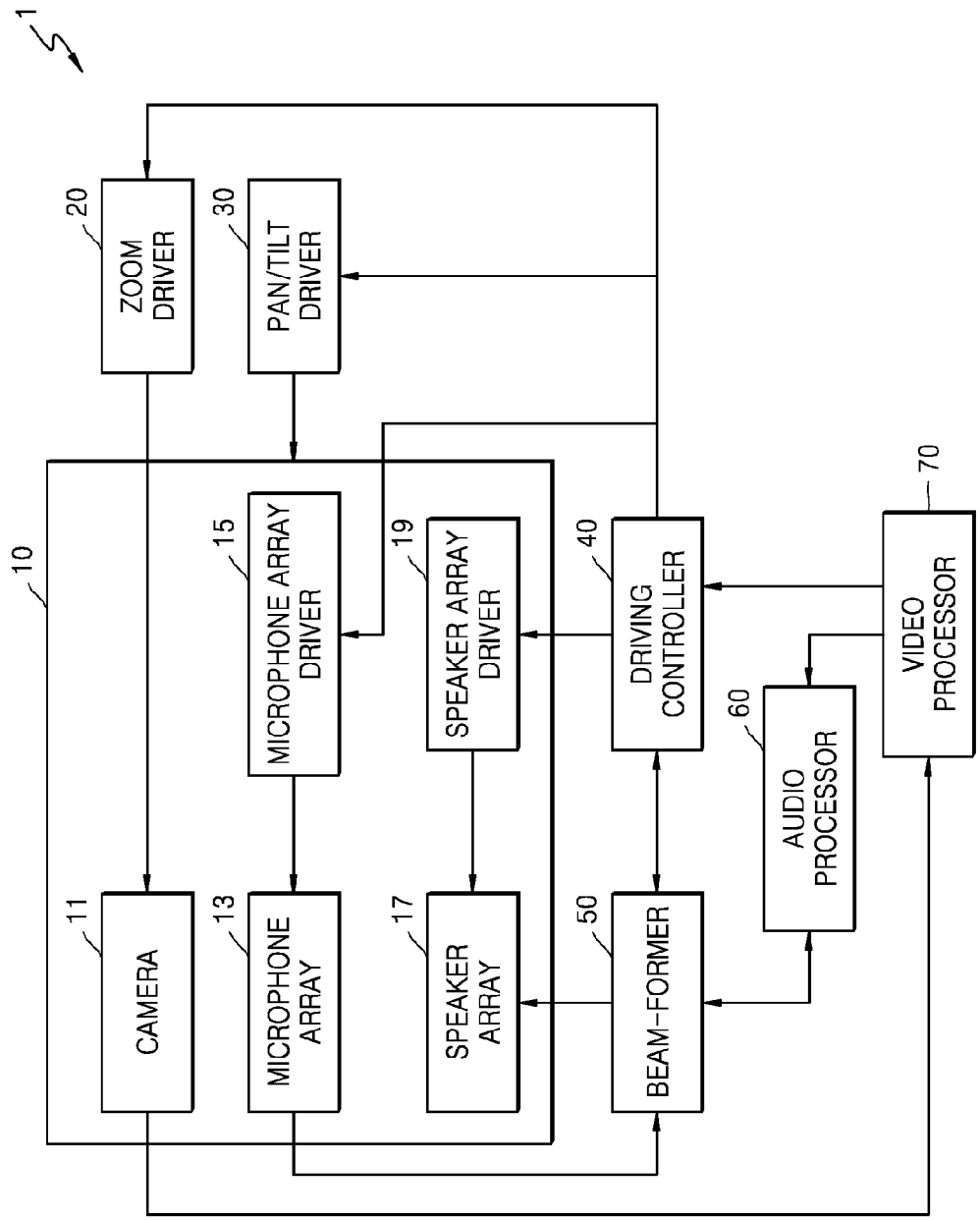
FIG. 1 is a block diagram of a structure of a camera system, according to an exemplary embodiment.

The advantages and features of the present inventive concept and methods of achieving the advantages and features will be described more fully with reference to the accompanying drawings, in which exemplary embodiments of the inventive concept are shown. The inventive concept may, however, be embodied in many different forms and should not be construed as being limited to the embodiments set forth herein; rather these embodiments are provided such that this disclosure will be thorough and complete, and will fully convey the inventive concept to one of ordinary skill in the art. Detailed explanation will not be given when it is determined that detailed explanation about well-known function and configuration of the present inventive concept may obscure the point of the present inventive concept.

The terminology used herein is for the purpose of describing particular embodiments only, and is not intended to be limiting of the inventive concept. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof. It will be understood that, although the terms first, second, etc. may be used herein to describe various elements, these elements should not be limited by these terms. These terms are only used to distinguish one element from another.

Hereinafter, the exemplary embodiments of the present inventive concept will be described in detail with reference to the accompanying drawings. In the drawings, like reference numerals refer to like elements throughout, and repeated descriptions thereof will be omitted. Expressions such as "at least one of," when preceding a list of elements, modify the entire list of elements and do not modify the individual elements of the list.

FIG. 1 is a block diagram of a structure of a camera system 1, according to an exemplary embodiment.

Referring to FIG. 1, the camera system 1 according to an exemplary embodiment may include an audio/video block 10, a zoom driver 20, a pan/tilt driver 30, a driving controller 40, a beam-former 50, an audio processor 60, and a video processor 70.

The audio/video block 10 may include a camera 11, a microphone array 13, a microphone array driver 15, a speaker array 17, and a speaker array driver 19.

The camera 11 photographs an image of a surveillance area. Although not shown, the camera 11 may include a lens, an image sensor for converting an optical signal input to the lens into an electrical signal, an analog/digital converter for converting the electrical signal output to the image sensor into a digital signal, an image processor for compensating for image quality from the digital signal and outputting an image in which a brightness signal and a chrominance signal are synthesized according to a predetermined standard, a codec unit, and a transmission unit for transmitting a photographed image. The lens may be a zoom lens, a fixed focal length lens, etc. However, the lens is not limited thereto.

Hereinafter, a video signal may denote an image output from the camera 11, and the terms of an image signal and a video signal may be interchangeably used.

The microphone array 13 may include a plurality of microphones, which are arranged apart from one another by a predetermined distance, and each of which receives an audio input signal. The plurality of microphones may be arranged in at least one of a straight line shape, a plane-circular shape, a sphere shape, and a spiral shape. However, the arrangement of the plurality of microphones is not limited thereto. The plurality of microphones may be symmetrically or asymmetrically arranged in their corresponding shape. Microphones forming the microphone array 13 may be directional, but are not limited thereto.

The microphone array driver 15 sets an angle between a central axis of the microphone array 13 and an optical axis of the camera 11. The microphone array driver 15 may include a plurality of microphone drivers, which may be respectively coupled with the plurality of microphones included in the microphone array 13. The plurality of microphone drivers may be arranged in a shape of at least one of a straight line type, a plane-circular type, a sphere type, and a spiral type, and may be symmetrically or asymmetrically arranged in their corresponding shape. However, the arrangement of the plurality of microphone drivers is not limited thereto. Also, the microphone drivers may also be disposed without respectively being coupled with the microphones and in different shapes.

Hereinafter, the microphone array 13 which may be disposed with an angle set by the microphone array driver 15 with respect to the camera 11 will be described in detail by referring to FIG. 2.

Figure 2:
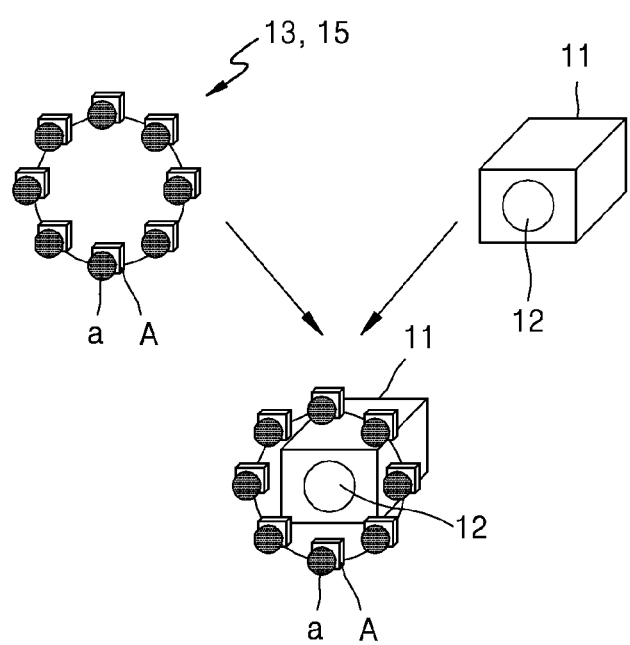
FIG. 2 is a view of a microphone array, according to an exemplary embodiment.

FIG. 2 is a view of the microphone array 13, according to an exemplary embodiment.

Referring to FIG. 2, the microphone array 13 including a plurality of microphones arranged in a plane-circular shape may be coupled with the microphone array driver 15 including a plurality of microphone drivers arranged in a plane-circular shape.

A microphone driver "A" may be connected to the camera 11 such that a microphone "a", specifically, an audio signal receiver of the microphone "a", is directed to the same direction as a lens 12 of the camera 11. The microphone driver "A" may set an angle between a central axis of the microphone "a" or the microphone array 13 and the optical axis of the camera 11 by rotating the microphone "a" or the microphone array 13. According to an exemplary embodiment, the microphone driver "A" may drive the microphone "a" or the microphone array 13 to be directed to a subject target while the optical axis of the camera 11 is not directed to the target.

FIG. 1 will be described again.

The speaker array 17 includes a plurality of speakers, which are arranged apart from one another by a predetermined distance, and each of which transmits an audio output signal. The plurality of speakers may be arranged in at least one of a straight line shape, a plane-circular shape, a sphere shape, and a spiral shape. However, the arrangement of the plurality of speakers is not limited thereto. The plurality of speakers may be symmetrically or asymmetrically arranged in their corresponding shape.

The speaker array 17 may be disposed in a manner of adjoining the microphone array 13, or may not be disposed in this manner so that the speaker array 17 is completely separated from the microphone array 13. For example, the plurality of speakers may be arranged between the plurality of microphones, respectively, in the adjoining manner.

The speaker array driver 19 sets an angle between a central axis of the speaker array 17 and the optical axis of the camera 11. The speaker array driver 19 may include a plurality of speaker drivers, which may be respectively coupled with the plurality of speakers included in the speaker array 17. The plurality of speaker drivers may be arranged in at least one of a straight line shape, a plane-circular shape, a sphere shape, and a spiral shape, and may be symmetrically or asymmetrically arranged in their corresponding shape. However, the arrangement of the plurality of speaker drivers is not limited thereto. Also, the speaker drivers may also be disposed without respectively being coupled with the speakers and in different shapes.

Hereinafter, the speaker array 17 which may set an angle with the camera 11 will be described in detail by referring to FIG. 3.

Figure 3:
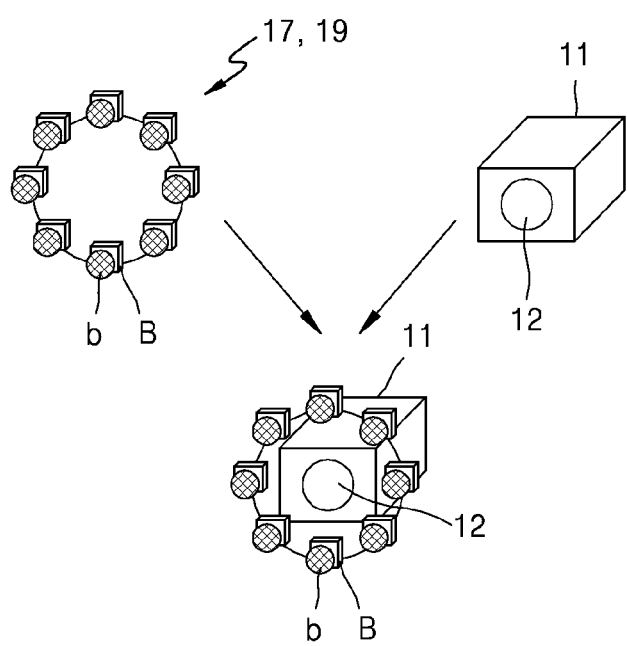
FIG. 3 is a view of a speaker array, according to an exemplary embodiment.

FIG. 3 is a view of the speaker array 17, according to an exemplary embodiment.

Referring to FIG. 3, the speaker array 17 including a plurality of speakers arranged in a plane-circular shape may be coupled with the speaker array driver 19 including a plurality of speaker drivers arranged in a plane-circular shape.

A speaker driver B may be connected to the camera 11 such that a speaker "b", specifically, an audio signal transmitter of the speaker "b", is directed to the same direction as the lens 12 of the camera 11. The speaker driver B may set an angle between a central axis of the speaker "b" or the speaker array 17 and the optical axis of the camera 11 by rotating the speaker "b" or the speaker array 17. According to an exemplary embodiment, the speaker driver "B" may drive the speaker "b" or the speaker array 17 to be directed to the subject while the optical axis of the camera 11 is not directed to the target.

Hereinafter, an audio system including a plurality of microphones and a plurality of speakers will be described in detail by referring to FIG. 4.

Figure 4:
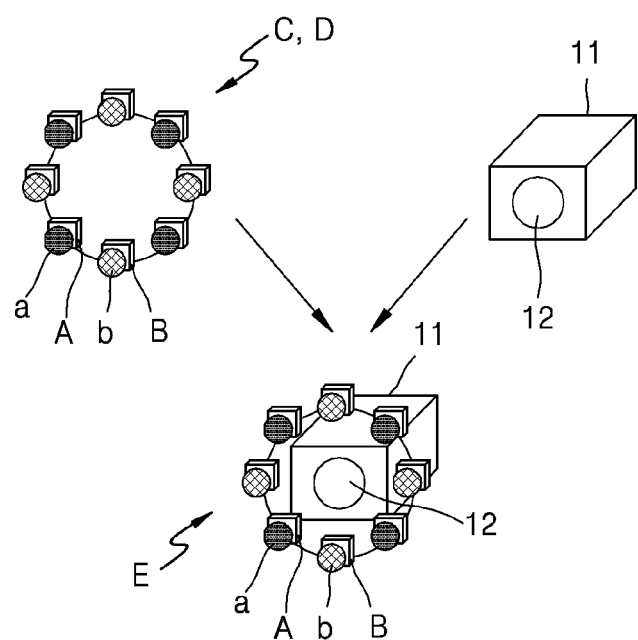
FIG. 4 is a view of an audio system array, according to an exemplary embodiment.

FIG. 4 is a view of an audio system array C, according to an exemplary embodiment.

Referring to FIG. 4, the audio system array C including a plurality of microphones and a plurality of speakers arranged in a plane-circular shape may be coupled with an audio system driver D including a plurality of microphone drivers and a plurality of speaker drivers arranged in a plane-circular shape.

The audio system driver D may be connected to the camera 11 such that each of the audio signal receivers of the microphones "a" and the audio signal transmitters of the speakers "b" is to the same direction as the lens 12 of the camera 11.

An audio/video block E, which corresponds to the audio/video block 10 of FIG. 1, may include the audio system array C, the audio system driver D, and the camera 11. In the audio/video block E, the camera 11 may be arranged in a center of the audio system array C or next to the audio system array C. However, the arrangement of the camera 11 is not limited thereto.

FIG. 1 will be described again.

The zoom driver 20 controls the lens included in the camera 11 to perform a zoom operation. For example, the zoom driver 20 may move a location of the zoom lens in a barrel (not shown), in order to change a focal length.

The pan/tilt driver 30 controls at least one of the lens included in the camera 11, the microphone array 13, and the speaker array 17 to perform at least one of pan rotation and tilt rotation.

For example, the pan/tilt driver 30 may drive the camera 11 such that at least one of the lens, the microphone array 13, and the speaker array 17 performs at least one of pan rotation or tilt rotation.

Hereinafter, the audio/video block E will be described in detail by referring to FIG. 5.

Figure 5:
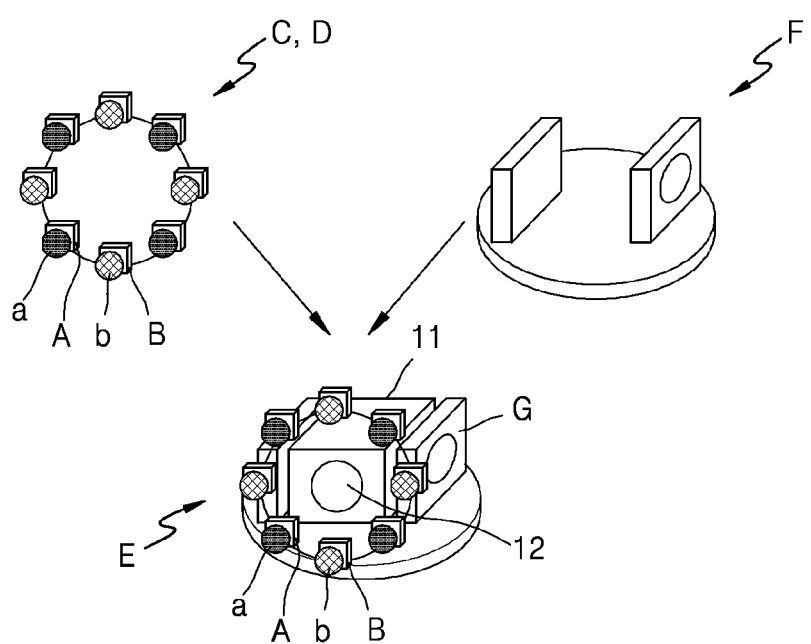
FIG. 5 is a view of an audio/video block, according to an exemplary embodiment.

FIG. 5 is a view of the audio/video block E, according to an exemplary embodiment.

Referring to FIG. 5, the audio/video block E may form an audio/video pan/tilt/zoom (PTZ) block G by being coupled to a pan/tilt block F. The audio/video PTZ block G may have a shape in which the audio/video block E is disposed between two pan/tilt drivers 30 (refer to FIG. 1), as illustrated in FIG. 5. However, the configuration of the audio/video PTZ block G is not limited thereto.

FIG. 1 will be described again.

The driving controller 40 controls a driving operation of the microphone array driver 15, the speaker array driver 19, the zoom driver 20, and the pan/tilt driver 30.

The driving controller 40 may rotate the lens of the camera 11 such that a subject is located in a center of an image. For example, when the camera 11 photographs an image, the video processor 70 determines a target subject designation mode. When the subject designation mode is an automatic designation mode, the video processor 70 determines whether the subject is located in the center of the image. When the subject is not located in the center of the image, the video processor 70 analyzes the location of the subject and calculates a rotation angle of the lens of the camera 11 for the subject to be located in the center of the image. The driving controller 40 controls the pan/tilt driver 30 to perform pan rotation and/or tilt rotation of the lens of the camera 11, based on the rotation angle of the lens of the camera 11 calculated by the video processor 70.

The driving controller 40 may rotate the microphone array 13 in a direction of the subject. For example, the beam-former 50 extracts from the driving controller 40 zoom track information corresponding to a zoom magnification of the lens driven by the zoom driver 20, and calculates a distance to the subject by using the zoom track information. The zoom track information may include a distance to a predetermined physical point. Here, the distance to the subject may not be a real distance between the camera system 1 and the subject, and instead, may be a relative distance in view of a reference such as the predetermined physical point set in the driving controller 40. When the beam-former 50 calculates a rotation angle of the microphone array 13 based on the distance to the subject, the driving controller 40 controls the pan/tilt driver 30 such that the microphone array driver 15 performs pan rotation and/or tilt rotation of the microphone array 13, based on the rotation angle of the microphone array 13. Alternatively, the driving controller 40 may directly control the microphone array driver 15 to perform the pan and/or tilt rotation of the microphone array 13. Here, according to an exemplary embodiment, if the microphone array 13 or at least one microphone "a" is already configured to be directed to the subject together with the lens of the camera 11, the beam-former 50 may skip the operation of calculating the rotation angle of the microphone array 13 or the microphone "a", and instead, the driving controller 40 may simply use the rotation angle of the lens of the camera 11 calculated by the video processor 70, as described above, as the rotation angle of the microphone array 13 or the microphone "a". In this case, according to another exemplary embodiment, the driving controller 40 may be configured to control the microphone array driver 15 to simply rotate the microphone array 13 or at least one microphone "a" together with the lens of the camera 11 based on the rotation angle of the lens of the camera 11 calculated by the video processor 70.

The driving controller 40 may rotate the speaker array 17 in the direction of the subject. For example, when the beam-former 50 determines a rotation angle of the speaker array 17 based on the rotation angle of the microphone array 13, the driving controller 40 controls the pan/tilt driver 30 such that the speaker array driver 19 performs pan rotation and/or tilt rotation of the speaker array 17, based on the rotation angle of the speaker array 17. Here, according to an exemplary embodiment, if the speaker array 17 or at least one speaker "b" is already configured to be directed to the subject together with the lens of the camera 11, the beam-former 50 may skip the operation of calculating the rotation angle of the speaker array 17 or the speaker "b", and instead, the driving controller 40 may simply use the rotation angle of the lens of the camera 11 calculated by the video processor 70, as described above, as the rotation angle of the speaker array 17 or the speaker "b". In this case, according to another exemplary embodiment, the driving controller 40 may be configured to control the speaker array driver 19 to simply rotate the speaker array 17 or at least one speaker "b" together with the lens of the camera 11 based on the rotation angle of the lens of the camera 11 calculated by the video processor 70.

According to another exemplary embodiment, the beam-former 50 may calculate the rotation angle of the microphone array 13 and/or the speaker array 17 based on a location of the subject, for example, a location of the subject on the image, without calculating the distance of the subject in the image. That is, the driving controller 40 may control the microphone array driver 15 and/or the speaker array driver 19 to rotate the microphone array 13 and/or the speaker array 17, respectively, based on the rotation angle calculated in this manner. At this time, the driving controller 40 may not control the pan/tilt driver to rotate the lens of the camera 11 such that the subject is located in the center of the image while the microphone array 13 and/or the speaker array 17 are rotated based on the calculated angle.

The beam-former 50 may perform hardware beam-forming and/or software beam-forming.

The hardware beam-forming denotes an operation of driving at least one of the microphone array driver 15, the speaker array driver 19, the zoom driver 20, and the pan/tilt driver 30, by using the driving controller 40 so that at least one of the microphone array 13 and the speaker array 17 (or at least one of the plurality of microphones and speakers) or its central axis is directed to a specific direction.

The software beam-forming denotes an operation of selecting only sound in a desired direction and removing sound or noise in an undesired direction, by assigning a different weight to each of the plurality of microphones included in the microphone array 13, or assigning a different weight to each of the plurality of speakers included in the speaker array 17.

For example, the beam-former 50 may amplify and analog-to-digital convert a plurality of audio input signals received by the microphone array 13. The beam-former 50 may decompose the plurality of audio input signals according to frequencies, by performing fast Fourier transform (FFT) on the plurality of audio input signals. Next, the beam-former 50 may apply a plurality of weights to the plurality of audio input signals decomposed according to the frequencies, and perform inverse fast Fourier transform (IFFT) on the plurality of audio input signals. The beam-former 50 may filter at least one predetermined audio input signal by digital-to-analog converting the plurality of audio input signals on which the IFFT is performed.

The beam-former 50 performs signal processing on the audio input signals generated from a predetermined sound source, and performs filtering for transmitting an audio output signal toward a target subject among a plurality of subjects. For example, the beam-former 50 may calculate a distance to the subject by using the zoom track information of the lens. The zoom track information may include information of an optical zoom magnification. The beam-former 50 may calculate a rotation angle of the microphone array 13 based on the distance to the subject. The beam-former 50 may performing signal processing on the plurality of audio input signals received from the direction of the subject by the microphone array 13 rotated in the direction of the subject. Also, the beam-former 50 may calculate the rotation angle of the speaker array 17 based on the rotation angle of the microphone array 13, and generate and transmit a plurality of audio output signals having different sizes and different phases, respectively, by using the plurality of speakers included in the speaker array 17.

The beam-former 50 may generate and transmit a plurality of same or difference audio output signals toward the plurality of subjects, respectively, by time division processing or at the same time. For example, the beam-former 50 may generate and transmit a first audio output signal in a direction of a first subject and a second audio output signal in a direction of a second subject by the time division method. The beam-former 50 may generate and transmit an audio output signal in the direction of the first subject by outputting a plurality of first audio output signals having different sizes or different phases via the plurality of speakers included in the speaker array 17, respectively, for a first time period. Next, the beam-former 50 may transmit an audio output signal in the direction of the second subject by outputting a plurality of second audio output signals having different sizes or different phase via the plurality of speakers included in the speaker array 17, respectively, for a second time period. The first time period and the second time period may be, for example, 0.5 seconds, that is, a time period in which the subjects cannot sense a break of a signal output, and the first time period and the second time period may be alternately repeated.

The beam-former 50 may perform filtering in at least one of a time area and a frequency area.

Hereinafter, referring to FIGS. 6A-6B and 7A-7B, a driving operation of the audio system array of FIG. 4 will be described in detail according to exemplary embodiments.

Figure 6A:
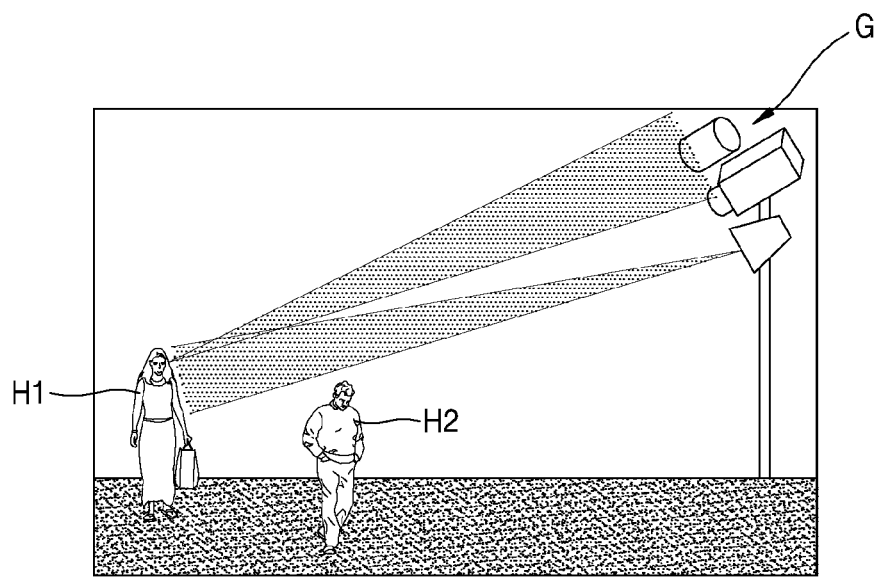
FIGS. 6A-6B are views for describing a method of driving an audio system array, according to exemplary embodiments.
Figure 6B:
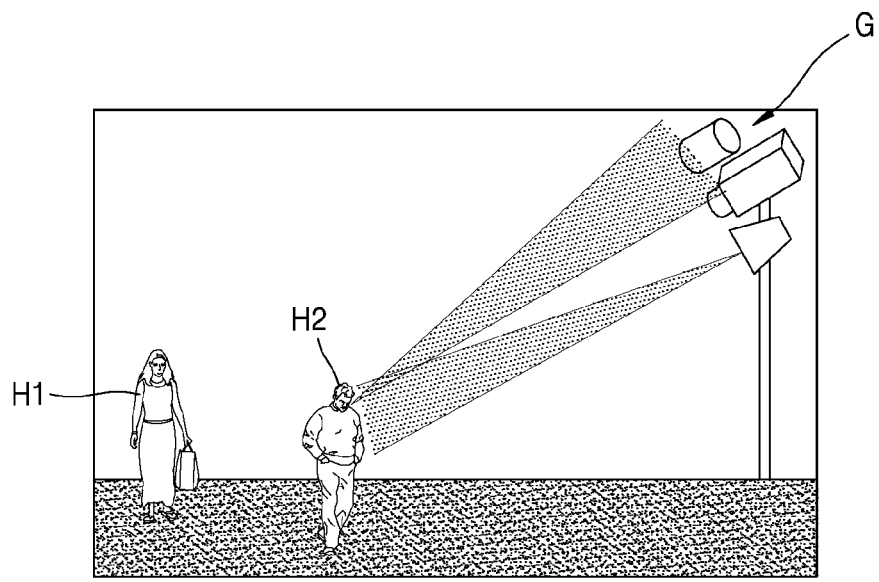

FIGS. 6A-6B are views for describing a method of driving an audio system array, according to exemplary embodiments.

Referring to FIG. 6A, the audio/video PTZ block G according to an exemplary embodiment receives an audio input signal generated from a first subject H1 and transmits an audio output signal toward the first subject H1.

Referring to FIG. 6B, the audio/video PTZ block G according to the present exemplary embodiment receives an audio input signal generated from a second subject H2 and transmits an audio output signal toward the second subject H2.

Here, the audio/video PTZ block G may change an object to and from which the audio signals are transmitted and received, from the first subject H1 to the second subject H2, by performing pan rotation and/or tilt rotation of the audio system array C.

Figure 7A:
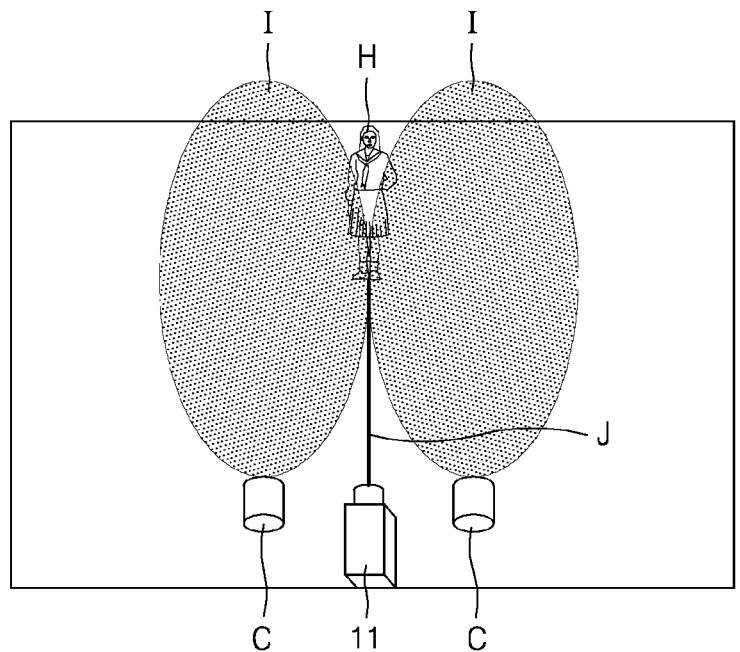
FIGS. 7A-7B are views for describing a driving operation of an audio system array, according to exemplary embodiments.
Figure 7B:
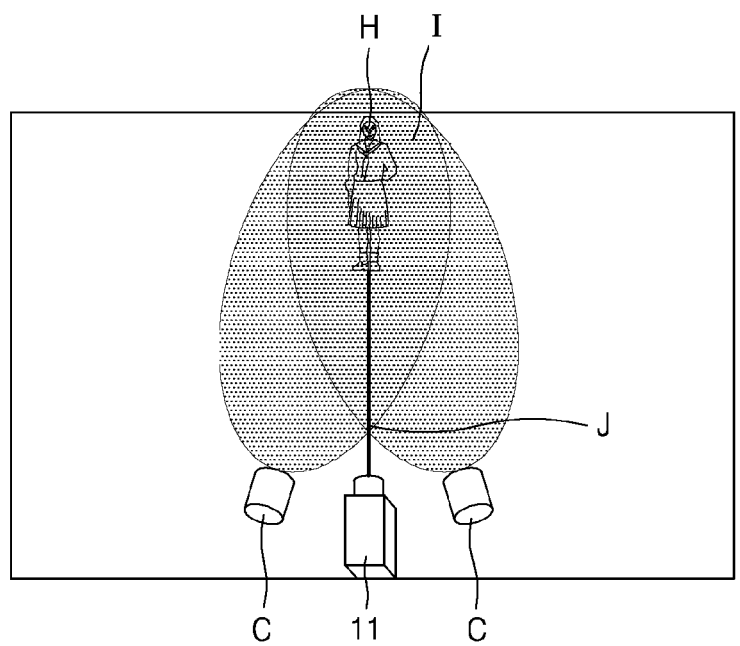

FIGS. 7A-7B are views for describing a driving operation of an audio system array, according to exemplary embodiments.

Hereinafter, descriptions will be made by assuming that the subject H is located in a point corresponding to an optical axis J of the camera 11.

As illustrated in FIG. 7A, when a transmission and reception area I in which the audio system array C transmits and receives audio signals is not directed to a point on an optical axis J of the camera 11, transmission and reception of the audio signals to and from the subject H in a remote area is inefficient.

As illustrated in FIG. 7B, according to an exemplary embodiment, when the audio system array C is driven toward the optical axis J of the camera 11, the transmission and reception area I becomes directed to the point corresponding to the optical axis J of the camera 11 so that audio zooming is possible, and thus, the audio signal transmission and reception to and from the remote subject H may be efficient.

FIG. 1 will be described again.

The audio processor 60 analyzes an audio input signal. The audio processor 60 may recognize a voice by matching at least one of facial information, a behavioral pattern and a situation of a target subject, recognized by the video processor 70, with the analyzed audio input signal, and may generate an audio output signal corresponding to the recognized voice. For example, the audio processor 60 may recognize the voice by matching a mouth shape of the subject recognized by the video processor 70 with the analyzed audio input signal, and may generate the audio output signal corresponding to the recognized voice. The audio processor 60 may accurately recognize the voice by matching the analyzed audio input signal with the video signal analyzed by the video processor 70. The audio output signal corresponding to the recognized voice may be a pre-recorded voice, an alarm sound, etc. The audio processor 60 may transmit the audio output signal corresponding to the recognized voice to the speaker array 17.

The audio processor 60 may recognize voices by matching mouth shapes of a plurality of subjects in the image, recognized by the video processor 70, with analyzed audio input signals, and may generate a plurality of audio output signals corresponding to recognized voices.

The video processor 70 analyzes a video signal.

The video processor 70 analyzes a location of a target subject in an image. When a subject designation mode is an automatic designation mode, the video processor 70 may determine whether the subject is located in the center of the image. When the subject is not located in the center of the image, the video processor 70 may analyze the location of the subject, based on the center of the image, and may calculate a rotation angle of a lens of a camera for the subject to be located in the center of the image. When the subject is located in the center of the image, the video processor 70 may designate the subject.

The video processor 70 performs at least one of a facial recognition of the subject, a behavioral pattern analysis, and a situation analysis. For example, the video processor 70 may recognize a mouth shape of the subject from the video signal. The video processor 70 identifies each of a plurality of subjects from the video signal. The video processor 70 may perform at least one of the facial recognition, the behavioral pattern analysis, and the situation analysis, with respect to each of the identified plurality of subjects.

Figure 8A:
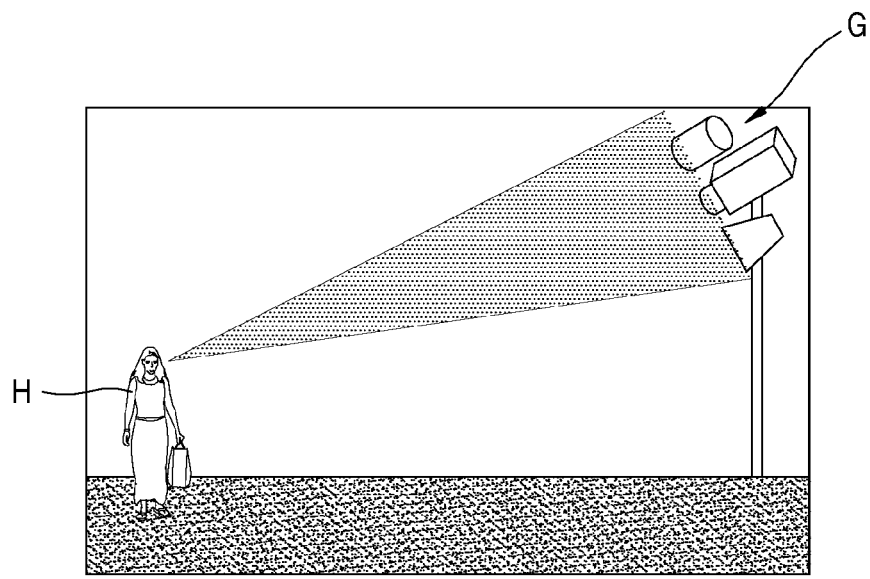
FIGS. 8A-8B illustrate views for describing a method of operating a camera system for receiving an audio signal, according to exemplary embodiments.
Figure 8B:
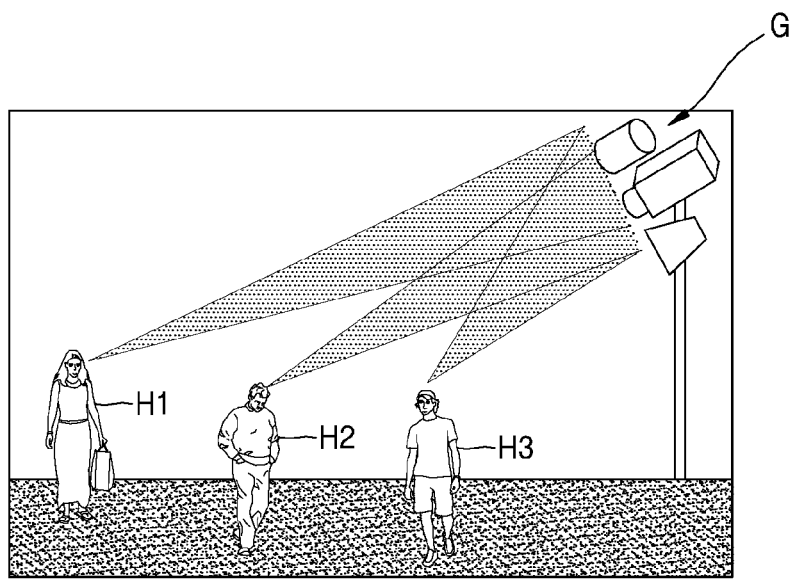

FIGS. 8A-8B illustrate views for describing a method of operating a camera system for receiving an audio signal, according to exemplary embodiments.

As illustrated in FIG. 8A, the audio/video PTZ block G according to an exemplary embodiment may designate a subject H, which is apart from the camera system 1 of FIG. 1 by a predetermined distance, as a target subject, and may receive an audio input signal generated from the subject H. When a microphone included in the audio/video PTZ block G is directional, the audio input signal generated from the subject H which is located remotely may be efficiently detected. The audio/video PTZ block G may perform software beam-forming to adjust a scope of audio detection and perform hardware beam-forming to adjust a distance for audio detection.

As illustrated in FIG. 8B, the audio/video PTZ block G according to an exemplary embodiment may designate a plurality of subjects as target subjects, that is, a first subject H1, a second subject H2, and a third subject H3, and may simultaneously receive a plurality of audio input signals generated from the first subject H1, the second subject H2, and the third subject H3, by a multiplexing method. The audio/video PTZ block G may perform hardware beam-forming such that the plurality of subjects are located in the image, and thus, a distance for audio detection with respect to the plurality of subjects may be adjusted. Also, the audio/video PTZ block G may perform software beam-forming for each of the plurality of subjects, and thus, a scope of audio detection with respect to each of the plurality of subjects may be adjusted.

Figure 9A:
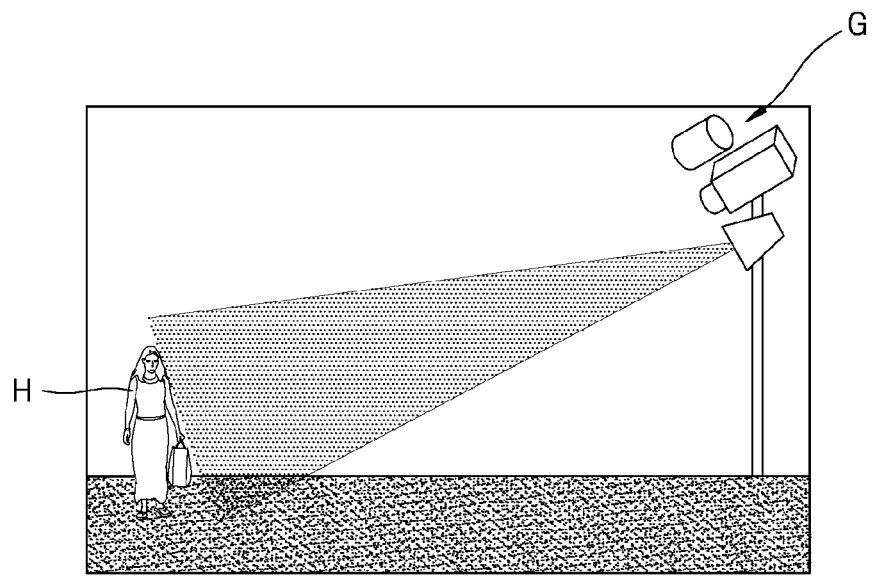
FIGS. 9A-9B illustrate views for describing a method of operating a camera system for transmitting an audio signal, according to exemplary embodiments.
Figure 9B:
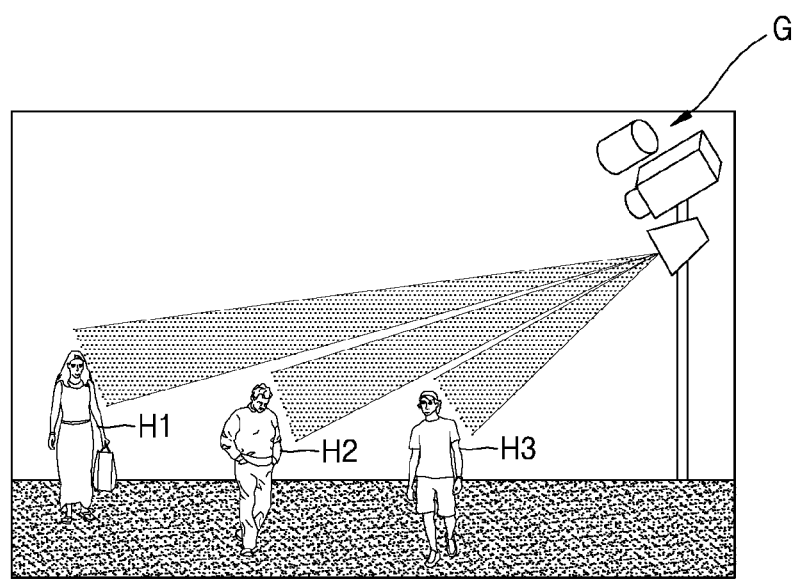

FIGS. 9A-9B illustrate views for describing a method of operating a camera system for transmitting an audio signal, according to exemplary embodiments.

As illustrated in FIG. 9A, the audio/video PTZ block G according to an exemplary embodiment may designate a subject H which is apart from the camera system 1 of FIG. 1 by a predetermined distance as a target subject, and may transmit an audio output signal toward the designated subject H. When the speaker included in the audio/video PTZ block G is directional, the audio output signal may be efficiently transmitted toward the subject H which is remotely located. The audio/video PTZ block G may perform software beam-forming to adjust a scope of audio transmission and may perform hardware beam-forming to adjust a distance for audio transmission.

As illustrated in FIG. 9B, the audio/video PTZ block G according to an exemplary embodiment may designate a plurality of subjects as target subjects, that is, a first subject H1, a second subject H2, and a third subject H3, and may simultaneously transmit a plurality of audio output signals toward the first subject H1, the second subject H2, and the third subject H3, by a multiplexing method. The audio/video PTZ block G may perform hardware beam-forming such that the plurality of subjects are located in the image, and thus, a distance for audio transmission with respect to the plurality of subjects may be adjusted. Also, the audio/video PTZ block G may perform software beam-forming for each of the plurality of subjects, and thus, a scope of audio transmission with respect to each of the plurality of subjects may be adjusted.

Hereinafter, FIG. 1 will be referred to for the components of the camera system 1.

Figure 10:
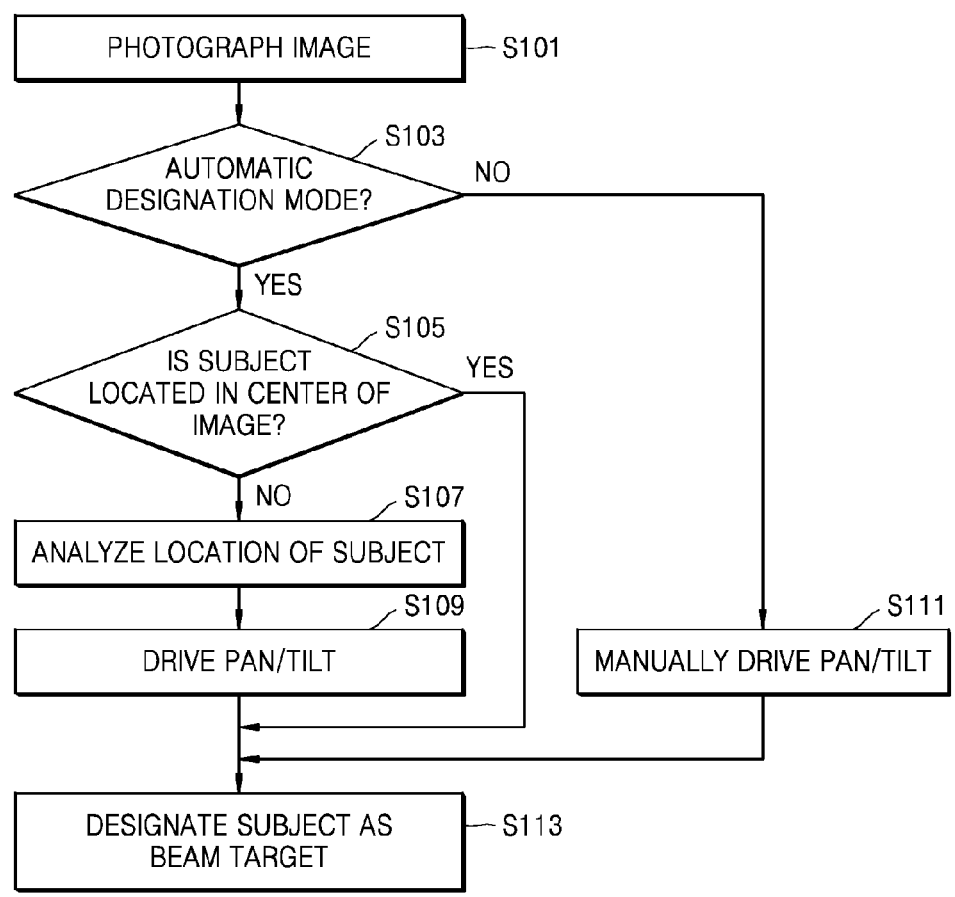
FIG. 10 is a flowchart of a method of designating a target subject, using a camera system, according to an exemplary embodiment.

FIG. 10 is a flowchart of a method of designating a target subject, using the camera system 1, according to an exemplary embodiment.

Referring to FIG. 10, when the camera 11 photographs or captures an image of a surveillance area in operation S101, the video processor 70 determines whether a subject designation mode is an automatic designation mode in operation S103.

When the subject designation mode is an automatic designation mode, the video processor 70 determines whether the subject is located in a center of the image in operation S105.

When the subject is not located in the center of the image, the video processor 70 analyzes the location of the subject in operation S107. The video processor 70 may calculate a rotation angle of a lens of the camera 11 for the subject to be located in the center of the image.

The driving controller 40 drives a pan/tilt of the lens in operation S109. The driving controller 40 may control the pan/tilt driver 30 such that the camera 11 may perform pan rotation and/or tilt rotation of the lens. The driving controller 40 may locate the subject in the center of the image by driving the pan/tilt of the lens, based on the rotation angle of the lens calculated by the video processor 70.

When the subject designation mode is a manual designation mode, the driving controller 40 drives the pan/tilt of the lens according to an input of a user in operation S111.

When the subject is located in the center of the image, the video processor 70 designates the subject in operation S113. The camera system according to exemplary embodiments may detect an audio input signal from a direction of the designated subject and transmit an audio output signal to the direction of the designated subject.

Figure 11:
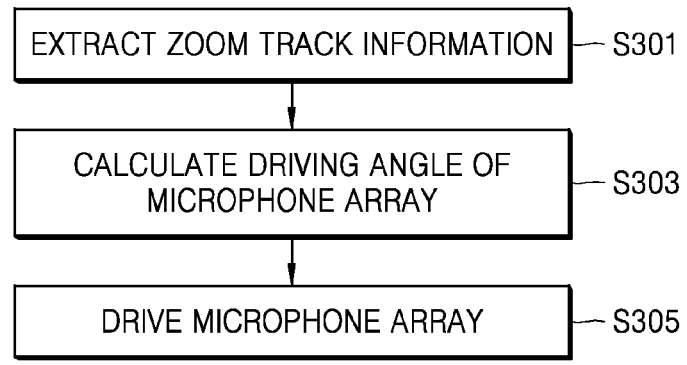
FIG. 11 is a flowchart of a method of driving a microphone array in a camera system, according to an exemplary embodiment.

FIG. 11 is a flowchart of a method of driving a microphone array in a camera system, according to an exemplary embodiment. Here, the microphone array may be the microphone array 13 of the camera system 1 illustrated in FIG. 1

Referring to FIG. 11, the beam-former 50 extracts zoom track information of the camera 11 in operation S301. The beam-former 50 may extract the zoom track information of the zoom driver 20 via the driving controller 40.

The beam-former 50 calculates a driving angle of the microphone array 13 in operation S303. The beam-former 50 may calculate a distance to the subject by using the zoom track information, and may calculate a rotation angle of the microphone array 13 based on the distance to the subject.

The driving controller 40 controls a driving operation of the microphone array 13 in operation S305. The driving controller 40 may control the pan/tilt driver 30 such that the microphone array driver 15 may perform pan/tilt rotation of the microphone array 13, based on the rotation angle of the microphone array 13 calculated by the beam-former 50.

As shown above, the beam-former 50 may make the microphone array 13 toward the designated subject by using the driving controller 40 and the microphone array driver 15.

Figure 12:
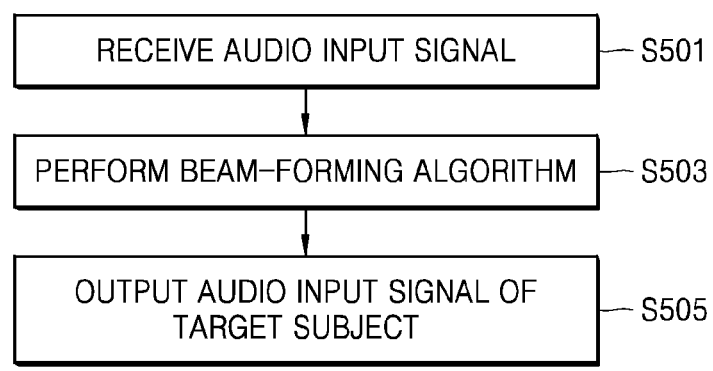
FIG. 12 is a flowchart of a method of detecting an audio input signal from a target subject, using a camera system, according to an exemplary embodiment.

FIG. 12 is a flowchart of a method of detecting an audio input signal from a target subject using a camera system, according to an exemplary embodiment. Here, the camera system may be the camera system 1 of FIG. 1.

Referring to FIG. 12, the microphone array 13 receives an audio input signal in operation S501. The microphone array 13 rotated in the direction of a target subject may receive an audio input signal generated from the subject.

When the beam-former 50 receives the audio input signal from the microphone array 13, the beam-former 50 may output (S505) an audio input signal of the subject by performing a beam-forming algorithm (S503). The beam-former 50 may perform the beam-forming algorithm to perform a signal processing operation on the audio input signal received by the microphone array 13, in order to output the audio input signal generated from the subject. The microphone array 13 may measure a sound pressure of a predetermined direction, in a sound field in which not only the audio input signal generated from the subject which is still or moving but also noise exist. The beam-former 50 may perform software beam-forming described above to remove the noise from the sound pressure measured in the predetermined direction.

Figure 13:
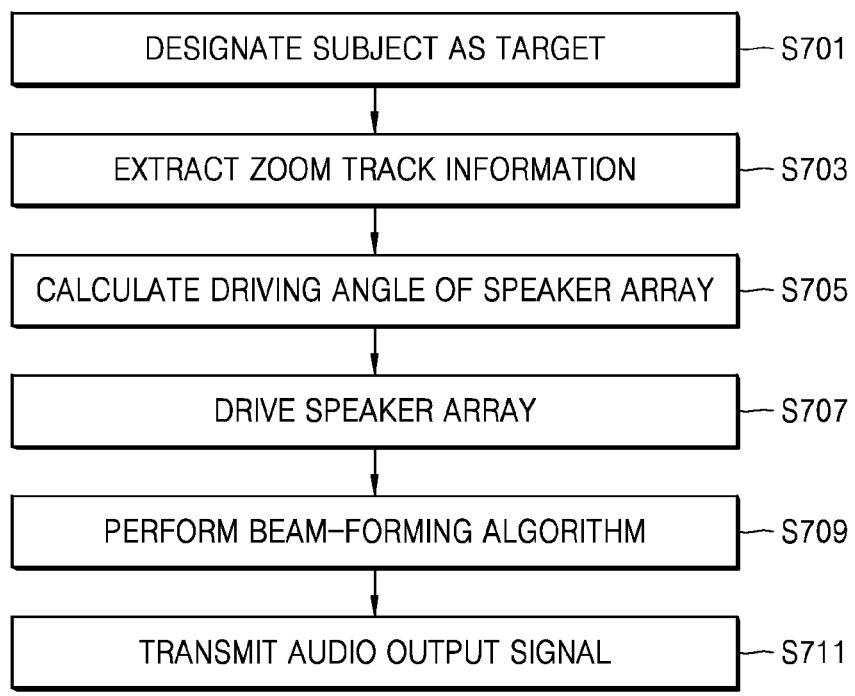
FIG. 13 is a flowchart of a method of transmitting an audio output signal, using a camera system, according to an exemplary embodiment.

FIG. 13 is a flowchart of a method of transmitting an audio output signal using a camera system, according to an exemplary embodiment. Here, the camera system may be the camera system 1 of FIG. 1.

Referring to FIG. 13, when the video processor 70 designates a target subject in operation S701, the beam-former 50 extracts zoom track information of the zoom driver in operation S703.

The beam-former 50 calculates a driving angle of the speaker array 17 in operation S705. The beam-former 50 may determine a rotation angle of the speaker array 17 based on the rotation angle of the microphone array 13 calculated in operation S303 of FIG. 11.

The driving controller 40 controls a driving operation of the speaker array 17 in operation S707. The driving controller 40 may control the pan/tilt driver 30 such that the speaker array driver 19 may perform pan rotation and/or tilt rotation of the speaker array 17, based on the rotation angle of the speaker array 17 calculated by the beam-former 50.

The beam-former 50 performs a beam-forming algorithm in operation S709. By the beam-forming algorithm, a plurality of audio output signals having either different sizes or different phases may be generated.

The speaker array 17 transmits the audio output signals in operation S711. The speaker array 17 rotated in a direction of at least one target subject may output the audio output signals toward the subject. Since the plurality of speakers included in the speaker array 17 output the plurality of audio output signals which are different in at least one of size and phase, the audio output signals which are directional may be output.

Figure 14:
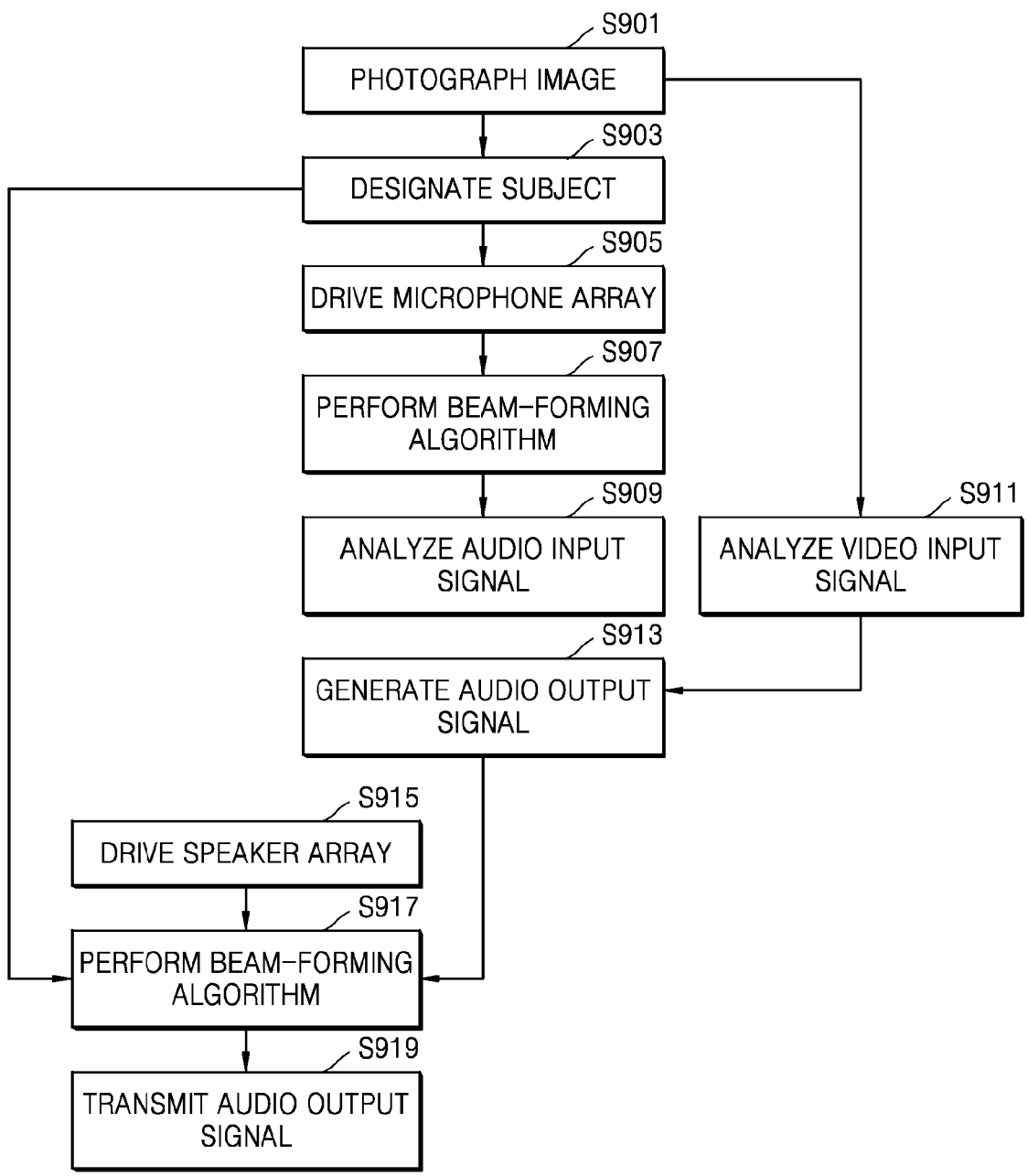
FIG. 14 is a flowchart of a method of generating an audio output signal through voice recognition, using a camera system, according to an exemplary embodiment.

FIG. 14 is a flowchart of a method of generating an audio output signal through voice recognition, using a camera system 1, according to an exemplary embodiment. Here, the camera system may be the camera system 1 of FIG. 1.

Referring to FIG. 14, when the camera 11 photographs an image in operation S901, the video processor 70 designates a target subject in operation S903.

The driving controller 40 controls a driving operation of the microphone array 13 such that the microphone array 13 is directed toward the designated subject, in operation S905.

When the microphone array 13 receives (not shown) an audio input signal generated in the subject, the beam-former 50 performs a beam-forming algorithm in operation S907, and outputs an audio input signal of the subject (not shown).

The audio processor 60 analyzes the audio input signal in operation S909 and the video processor 70 analyzes a video signal photographed in operation S901, in operation S911.

The audio processor 60 generates an audio output signal by using the analyzed audio input signal and the analyzed video signal in operation S913. The audio processor 60 may recognize a voice by matching results of video signal analyses, that is, at least one of a facial recognition result of the subject, a result of a behavioral pattern analysis, and a result of a situation analysis, with the audio input signal. The audio input signal that is matched with the results of video signal analyses may denote an audio input signal which is simultaneously received with the video signal. Next, the audio processor 60 may generate the audio output signal corresponding to the recognized voice.

The driving controller 40 controls a driving operation of the speaker array 17 such that the speaker array 17 rotates in the direction of the subject, in operation S915.

The beam-former 50 performs a beam-forming algorithm in operation S917 and transmits the audio output signal toward the subject in operation S919. Here, since the speaker array 17 is beam-formed toward the subject by the beam-former 50, the exact audio output signal may be transmitted only to the subject. The audio output signal may be a pre-recorded voice, an alarm sound, a voice by an input of a user, an alarm sound, etc. However, the audio output signal is not limited thereto.

FIG. 15 is a flowchart of a method of transmitting and receiving an audio signal with respect to each of a plurality of subjects, using a camera system, according to an exemplary embodiment. Here, the camera system may be the camera system 1 of FIG. 1.

Referring to FIG. 15, the camera 11 photographs an image including a plurality of subjects in operation S1101. The driving controller 40 may drive a pan/tilt of a lens such that the plurality of subjects are located in the image photographed by the camera 11.

The beam-former 50 extracts zoom track information of the zoom driver 20 in operation S1103, and calculates a distance to at least one target subject by using the zoom track information in operation S1105. Here, the calculated distance may be a plurality of distances of the plurality of subjects respectively measured from the camera 11. The calculated distance may be a representative distance to the plurality of subjects. For example, the representative distance may be a distance to a subject located in a center area of the plurality of subjects. Also, the calculated distance may be an average of a plurality of distances to the plurality of subjects. The beam-former 50 may calculate a rotation angle of the microphone array 13 and the speaker array 17 based on the distance to the subject.

The beam-former 50 controls a driving operation of the microphone array 13 and the speaker array 17 in operation S1107. The beam-former 50 may control a driving operation of the microphone array 13 and the speaker array 17 based on the calculated rotation angle of the microphone array 13 and the speaker array 17.

When the camera 11 photographs the image including the plurality of subjects in operation S1101, the video processor 70 analyzes the photographed video signal in operation S1109.

The video processor 70 detects the plurality of subjects from the video signal in operation S1111, and labels each of the plurality of subjects in operation S1113.

The beam-former 50 performs a beam-forming algorithm with respect to each of the plurality of subjects in operation S1115. The beam-former 50 may perform software beam-forming of a multiplexing method, by using location information in an image of each of the labeled plurality of subjects.

When the microphone array 13 receives an audio input signal of each of the plurality of subjects in operation S1117, the audio processor 60 detects an audio input signal of each of the plurality of subjects in operation S1119. The audio processor 60 may match the detected plurality of audio input signals with the labeled plurality of subjects, respectively. For example, the audio processor 60 may recognize a voice of each of the plurality of subjects.

Then, the audio processor 60 generates an audio output signal for each of the plurality of subjects in operation S1121. The audio processor 60 may generate audio output signals corresponding to the recognized voices, respectively.

The beam-former 50 performs a beam-forming algorithm of a time division method or at the same time, with respect to each of the plurality of subjects, in operation S1123, and transmits the plurality of audio output signals toward the plurality of subjects, respectively, in the time division method or at the same time in operation S1125. For this beam-forming, the plurality of speakers may be used to transmit a plurality of different audio signals in the time division method or at the same time.

As described above, according to the exemplary embodiments, since an audio system array is controlled to be always toward a target subject, an optimized directionality may be provided. Also, since audio zooming is possible, a three-dimensional beam-forming operation may be performed.

Also, even when the sound source is moved, pan rotation and/or tilt rotation of the audio system array is performed so that a direction of the sound source and a direction of the audio system array may be matched. Accordingly, a Doppler effect generated due to a relative motion may be removed.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements, modules or units represented by a block, such as the zoom driver 20, the pan/tilt driver 30, the driving controller 40, the beam-former 50, the audio processor 60 and the video processor as illustrated in FIG. 1 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While the above exemplary embodiments have been described with reference to the accompanying drawings, it will be understood by those of ordinary skill in the art that various changes in form and details may be made therein without departing from the spirit and scope of the inventive concept as defined by the following claims.

What is claimed is:

1. A camera system comprising:
   a camera configured to capture an image of a surveillance area;
   a speaker array which comprises a plurality of speakers,
   a microphone array which comprises at least one microphone; and
   at least one processor configured to implement:
      a video processor which designates at least one subject in the image as a target;
      a beam-former which calculates a rotation angle of the microphone array based on a location of the at least one subject; and
      a driving controller which rotates the microphone array in a direction toward the at least one subject based on the rotation angle of the microphone array,
   wherein the beam-former further performs signal processing on an audio input signal received through the microphone array rotated in the direction toward the at least one subject,
   wherein the at least one microphone comprises a plurality of microphones, and the at least one subject comprises a plurality of subjects, and
   wherein the at least one processor is further configured to implement an audio processor which generates a plurality of audio output signals based on audio input signals received through the plurality of microphones and controls the beam-former to transmit the plurality of audio output signals toward the plurality of subjects through the plurality of speakers, respectively, in a time division multiplexing manner.

2. The camera system of claim 1, wherein in response to the at least one subject not being located in a center of the image, the video processor calculates a rotation angle of a lens of the camera, and the driving controller rotates the lens of the camera based on the rotation angle of the lens so that the at least one subject is located in the center of the image, and wherein in response to the at least one subject being located in the center of the image, the video processor designates the at least one subject as the target.

3. The camera system of claim 1, wherein the beam-former determines a rotation angle of the speaker array based on the rotation angle of the microphone array, and the driving controller rotates the speaker array toward the at least one subject based on the rotation angle of the speaker array.

4. The camera system of claim 1, wherein the beam-former calculates a distance from the camera to the at least one subject, and calculates the rotation angle of the microphone array using the calculated distance.

5. The camera system of claim 1, wherein the video processor generates an image analysis result by performing at least one of facial recognition of the at least one subject, a behavioral pattern analysis of the at least one subject, and a situation analysis with respect to the image, and wherein the audio processor recognizes sound of the at least one subject by matching the image analysis result with the audio input signal received through the microphone array and generates an audio output signal corresponding to the sound.

6. The camera system of claim 1, wherein the beam-former calculates rotations angles of the plurality of microphones based on locations of the plurality of subjects, respectively, and wherein the driving controller rotates the plurality of microphones toward the plurality of subjects based on the rotation angles of the plurality of microphones so that the beam-former performs the signal processing on the audio input signals received through the plurality of microphones rotated toward the at least one subject, respectively.

7. The camera system of claim 1, wherein the audio processor generates the plurality of audio output signals which are multiplexed and different in at least one of an amplitude and a phase, respectively.

8. A method of operating a camera system comprising a camera and a microphone array which comprises at least one microphone by using at least one processor, the method comprising:

capturing an image of a surveillance area using the camera;

designating at least one subject in the image as a target;

calculating a rotation angle of the microphone array based on a location of the at least one subject;

rotating the microphone array toward the at least one subject based on the rotation angle of the microphone array; and receiving an audio input signal through the microphone array rotated toward the at least one subject, wherein the at least one microphone comprises a plurality of microphones, and the at least one subject comprises a plurality of subjects, and wherein the method further comprises generating a plurality of audio output signals based on audio input signals received through the plurality of microphones, and transmitting the plurality of audio output signals towards the plurality of subjects, respectively, in a time division multiplexing manner.

9. The method of claim 8, further comprising:

generating an audio output signal based on the audio input signal received through the microphone array; and transmitting the audio output signal toward the at least one subject through a speaker array which comprises at least one speaker.

10. The method of claim 8, further comprising:

determining the location of the at least one subject; and in response to the at least one subject not being located in a center of the image, calculating a rotation angle of a lens of the camera, and rotating the lens based on the rotation angle of the lens so that the at least one subject is located in the center of the image, wherein the designating the at least one subject as the target is performed in response to the at least one subject being located in the center of the image.

11. The method of claim 8, wherein the camera system further comprises a speaker array which comprises at least one speaker, and wherein the method further comprises:

determining a rotation angle of the speaker array based on the rotation angle of the microphone array, and rotating the speaker array toward the at least one subject based on the rotation angle of the speaker array; and generating an audio output signal toward the at least one subject corresponding to the audio input signal received through the microphone array.

12. The method of claim 8, further comprising calculating a distance from the camera to the at least one subject which is used to calculate the rotation angle of the microphone array.

13. The method of claim 8, further comprising:

generating an image analysis result by performing at least one of facial recognition of the at least one subject, a behavioral pattern analysis of the at least one subject, and a situation analysis with respect to the image; and recognizing sound of the at least one subject by matching the image analysis result with the audio input signal received through the microphone array and generating an audio output signal corresponding to the sound.

14. The method of claim 8, wherein the calculating the rotation angle of the microphone array comprises calculating rotations angles of the plurality of microphones based on locations of the plurality of subjects, respectively, and wherein the rotating the microphone array toward the at least one subject comprises rotating the plurality of microphones toward the plurality of subjects based on the rotation angles of the plurality of microphones to receive the audio input signals through the plurality of microphones rotated toward the at least one subject, respectively.

15. The method of claim 8, wherein the plurality of audio output signals are multiplexed and different in at least one of an amplitude and a phase, respectively.

* * * * *